No. 878,262.
W. E. WILLIAMS.
SHREDDING MACHINE.
APPLICATION FILED OCT. 4, 1904.
PATENTED FEB. 4, 1908.
2 SHEETS—SHEET 1.
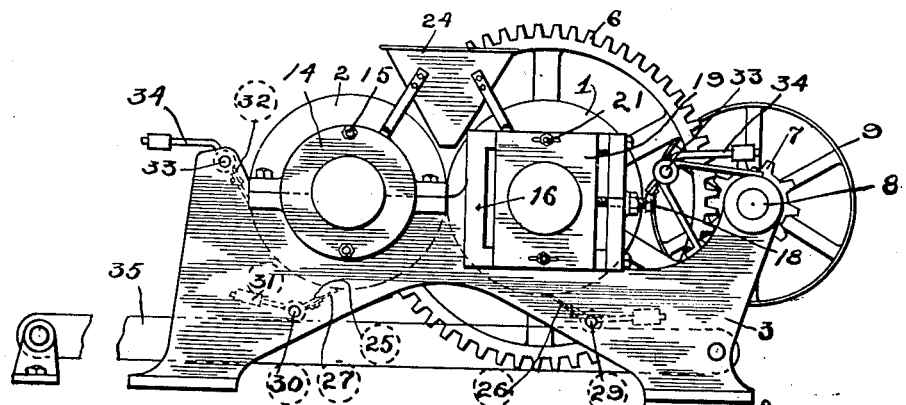
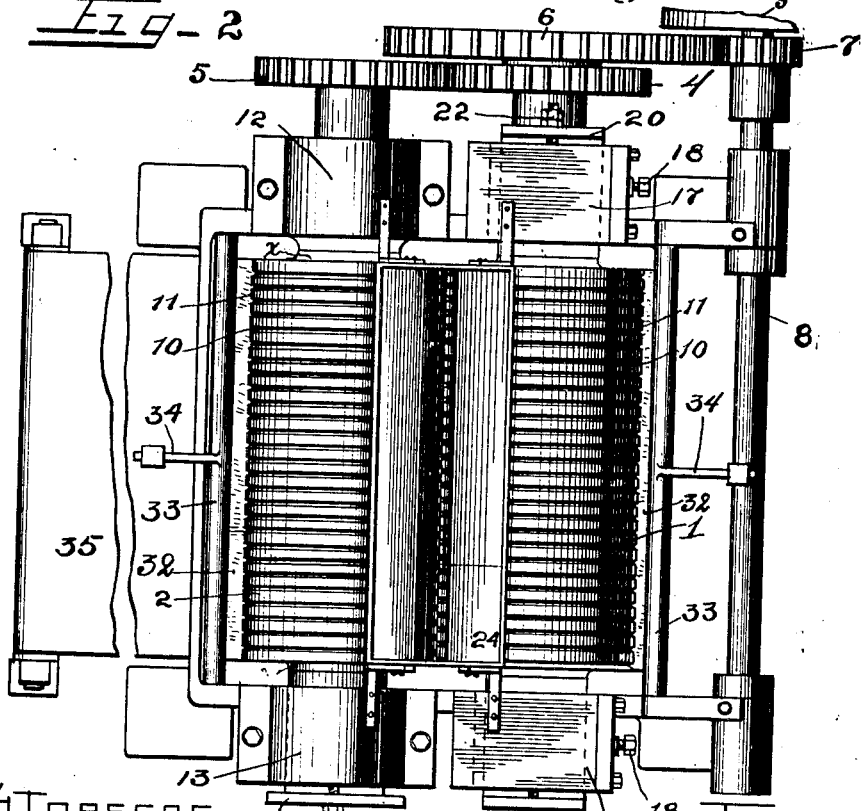
Witnesses
J. W. Angell.
B. M. Brshine,
Inventor
William E. Williams
by Wallace Greene, Atty.

No. 878,262.

PATENTED FEB. 4, 1908.

W. E. WILLIAMS.
SHREDDING MACHINE.
APPLICATION FILED OCT. 4, 1904.

2 SHEETS—SHEET 2.

Witnesses
Inventor
William E. Williams
by Wallace Greene, Atty.

UNITED STATES PATENT OFFICE.

WILLIAM ERASTUS WILLIAMS, OF CHICAGO, ILLINOIS.

SHREDDING-MACHINE.

No. 878,262.      Specification of Letters Patent.      Patented Feb. 4, 1908.

Application filed October 4, 1904. Serial No. 227,146.

*To all whom it may concern:*

Be it known that I, WILLIAM ERASTUS WILLIAMS, a citizen of the United States of America, and a resident of Chicago, county of Cook, and State of Illinois, have invented certain new and useful Improvements in Shredding-Machines, of which the following is a specification.

The object of this invention is to provide an improved machine for shredding cereals and the like for making shredded wheat biscuits and similar products.

Figure 3:
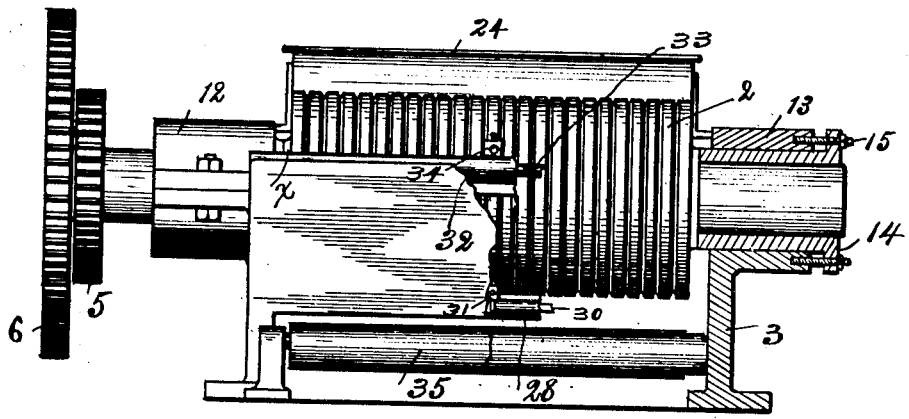
Figure 4:
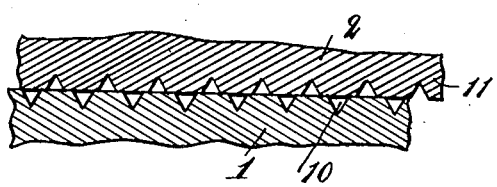
Figure 5:
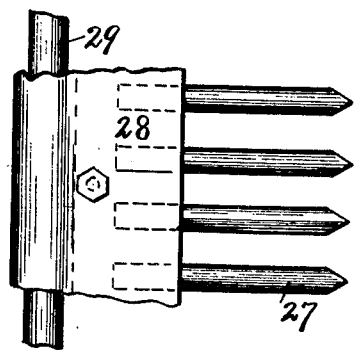
Figure 6:
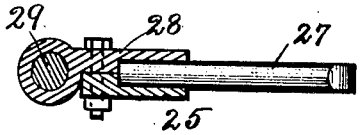

In the accompanying drawings, Figure 1 shows my machine in side elevation. Fig. 2 shows the same in plan view. Fig. 3 is a view partly in section, looking from the left in Figs. 1 and 2. Fig. 4 is a detail view showing in longitudinal section a part of two shredding rollers in normal contact. Figs. 5 and 6 are, respectively, plan and sectional views of portions of certain scrapers.

In this machine, a pair of grooved rolls, 1, 2, are revolubly mounted, in contact, in a frame 3 and connected by gears 4, 5, driven from any suitable source of power by means of a belt pulley 9, shaft 8, pinion 7 and gear 6. The rolls are both provided with many circumferential, V-shaped grooves 10 so spaced as to leave between successive grooves an intact portion of the roller perhaps twice as wide as the grooves themselves, and each groove of each roller is located opposite an intact portion of the companion roller.

At one end of the roll 2, the roll shaft is mounted in a fixed bearing 12 against which a hub-like projection, $x$, of the roll bears, while at the opposite end of the roll the shaft is borne by a sleeve 14, flanged at its outer end, adjustably mounted in a bearing 13, and normally made to hold the opposite end of the roller in contact with the bearing 12 by means of screws 15 which draw its flange toward the bearing 13 in which the screws work, and thus make it possible to compensate wear.

It is desirable that the companion roll, 1, should be adjustable longitudinally, to secure accurate registry between the grooves of one roll and the spaces between the grooves of the other roll, and also that it should be adjustable laterally and provided with means for pressing it toward the roll 2. With these objects in view, the shaft of this roll is mounted, at both ends of the roll, in sleeves 19, 20, similar to the sleeve 14, already described, and like it pressed against the corresponding ends of the roller by screws, which in this case are designated by the numerals 21, 22, respectively. The bearings 16, 17, corresponding to the bearing 13, are in this case made wider than the sleeves which lie in them and these sleeves are adjusted laterally by screws 18, the flanges of the sleeves being slotted, as shown, to allow the sleeves to move laterally although the bolts or screws 21, 22 remain fixed.

The material to be shredded is placed in a hopper 24 whence it falls between the rolls, and as the latter are in contact, as nearly as may be, the material normally passes only in the grooves, from which it is removed by scrapers 25, 26 consisting of spring fingers 27 clamped in rocking bars 28, supported on rods 29, 30 and provided with counterweights 31 holding the spring fingers up to their work. If owing to imperfect contact material should pass between the cylindrical surfaces of the rollers, such material will be split into thin narrow ribbons by the spring fingers and will be removed by similar scrapers 32 mounted upon rods 33 and yieldingly held against the rollers by counterweights 34. The material on leaving the rolls falls upon a belt conveyer 35 driven in any suitable manner. It is to be observed that this arrangement of grooves permits nearly as many shreds as would be formed were one roller provided with closely contiguous grooves and yet gives a large body of metal between consecutive grooves. The rolls are thus much more durable and metal may be used that would otherwise be unsuitable.

What I claim is—

1. In a shredding machine, the combination with a pair of parallel, osculating coacting rolls each having a series of circumferential grooves registering with ungrooved portions of the companion roll, of means for removing material from the grooves.

2. In a shredding machine a set of grooved rolls having alternate grooves and flat spaces, mounted in such manner that the grooves of one are opposite the spaces of the other and provided with adjustments for the rolls to secure a nicety of adjustment of the spaces, and means for removing the material from the grooves.

3. In a shredding machine a set of rolls provided with alternate grooves and flat spaces, with means for adjusting the rolls to and from each other, and means for adjusting them longitudinally, and provided with scrapers for scaping the material from the rolls.

4. In a shredding machine, a set of rolls provided with alternate circumferential grooves and flat spaces with means for adjusting the rolls together and longitudinally, with scrapers composed of individual fingers for scraping the grooves, and with flat scrapers for scraping the spaces substantially as shown.

Signed at Chicago this 28th day of September 1904.

WILLIAM ERASTUS WILLIAMS.

Witnesses:
ROBT. C. BORN,
CECIL BRONSON.